United States Patent [19]
Nelson

[11] 4,160,619
[45] Jul. 10, 1979

[54] HORIZONTALLY ARTICULATED SHUTTLE CAR

[75] Inventor: Robert C. Nelson, Bluefield, W. Va.

[73] Assignee: New River Manufacturing Company, Inc., Glen Lyn, Va.

[21] Appl. No.: 848,761

[22] Filed: Nov. 4, 1977

[51] Int. Cl.² .............................................. B60P 1/38
[52] U.S. Cl. .................... 414/501; 414/528; 180/134; 180/77 MC
[58] Field of Search .................... 214/83.36, 83.14, 82, 214/518, 519, 17 D, 17 DA; 180/134, 73 R, 77 MC, 49–52; 280/419, 71; 222/622; 298/1 B

[56] References Cited

U.S. PATENT DOCUMENTS

| | | | |
|---|---|---|---|
| 2,266,280 | 12/1941 | Sherman | 180/73 R |
| 2,592,532 | 4/1952 | Beck | 214/83.36 |
| 2,599,061 | 6/1952 | Lee | 214/83.36 |
| 2,613,800 | 10/1952 | Merck | 214/83.36 X |
| 3,183,017 | 5/1965 | Lundquist | 214/83.36 X |
| 3,426,862 | 2/1969 | Wilfert | 180/73 R |
| 3,439,937 | 4/1969 | Dixon | 180/51 X |
| 3,908,841 | 9/1975 | Lee et al. | 214/83.36 |

*Primary Examiner*—Albert J. Makay

*Attorney, Agent, or Firm*—McCaleb, Lucas & Brugman

[57] ABSTRACT

A mine haulage vehicle comprising a body having front and rear sections which are pivotally interconnected at adjacent ends enabling them to swing freely in a horizontal plane relative to each other about a vertical pivot axis. The body has a pair of ground-engaging wheels on each of the body sections. The vehicle is steered by hydraulic cylinders connected between the body sections for swinging them about the pivot axis. The body sections have aligned trough-shaped compartments extending substantially its full length and containing a horizontally flexible, center strand, orbital, chain conveyor. The rear body section has a load-carrying compartment above the conveyor and has upstanding push blades on opposite sides of the conveyor with power cylinders to move the blades inwardly and to transfer material onto the conveyor during unloading. Use of the vehicle is characterized by one-direction movement of load by the conveyor so it is never necessary to turn the vehicle around while transferring material from a mine face to a remote discharge location, and movement around tight corners is facilitated by the relative horizontal swinging movement between the two body sections.

9 Claims, 17 Drawing Figures

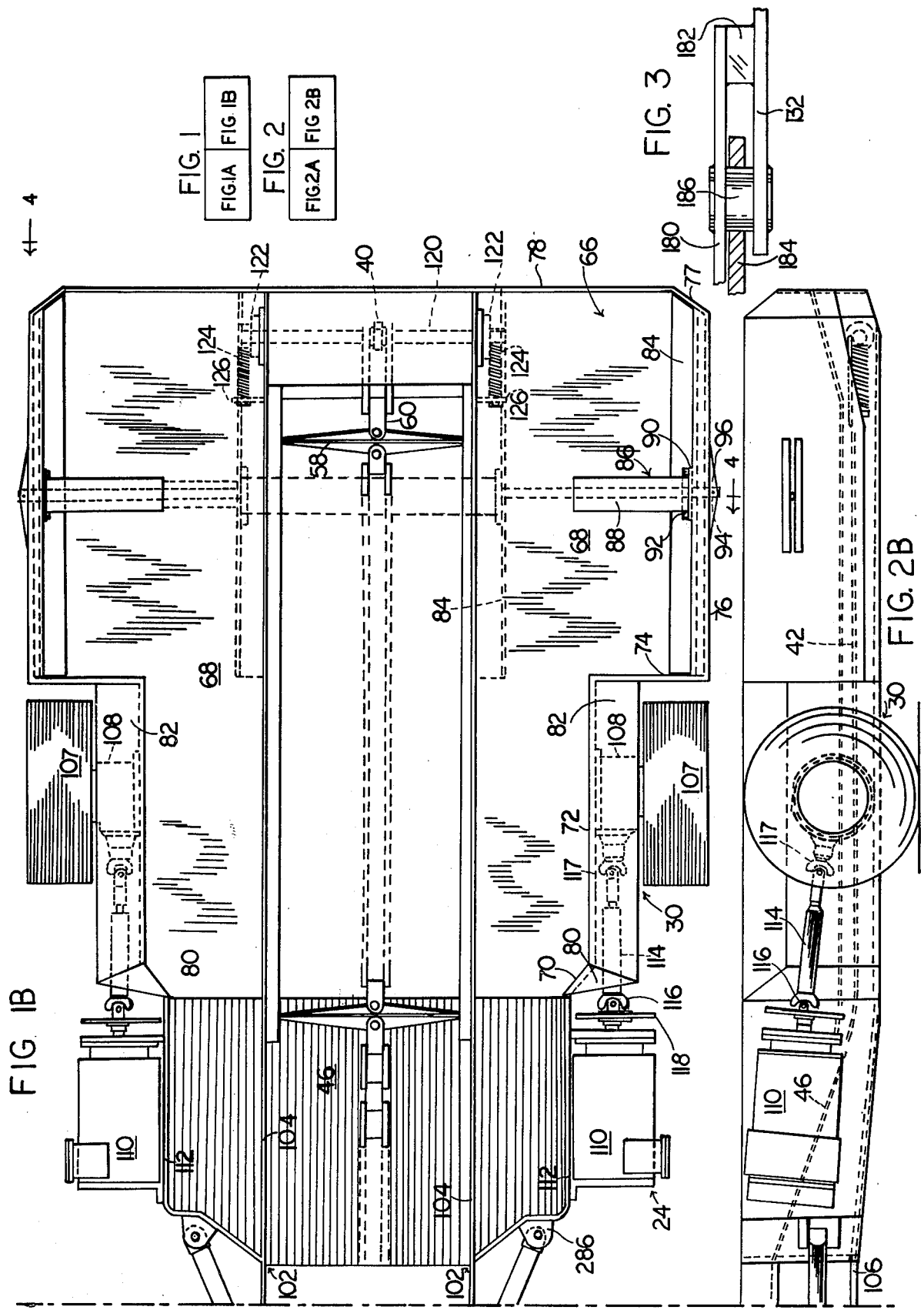

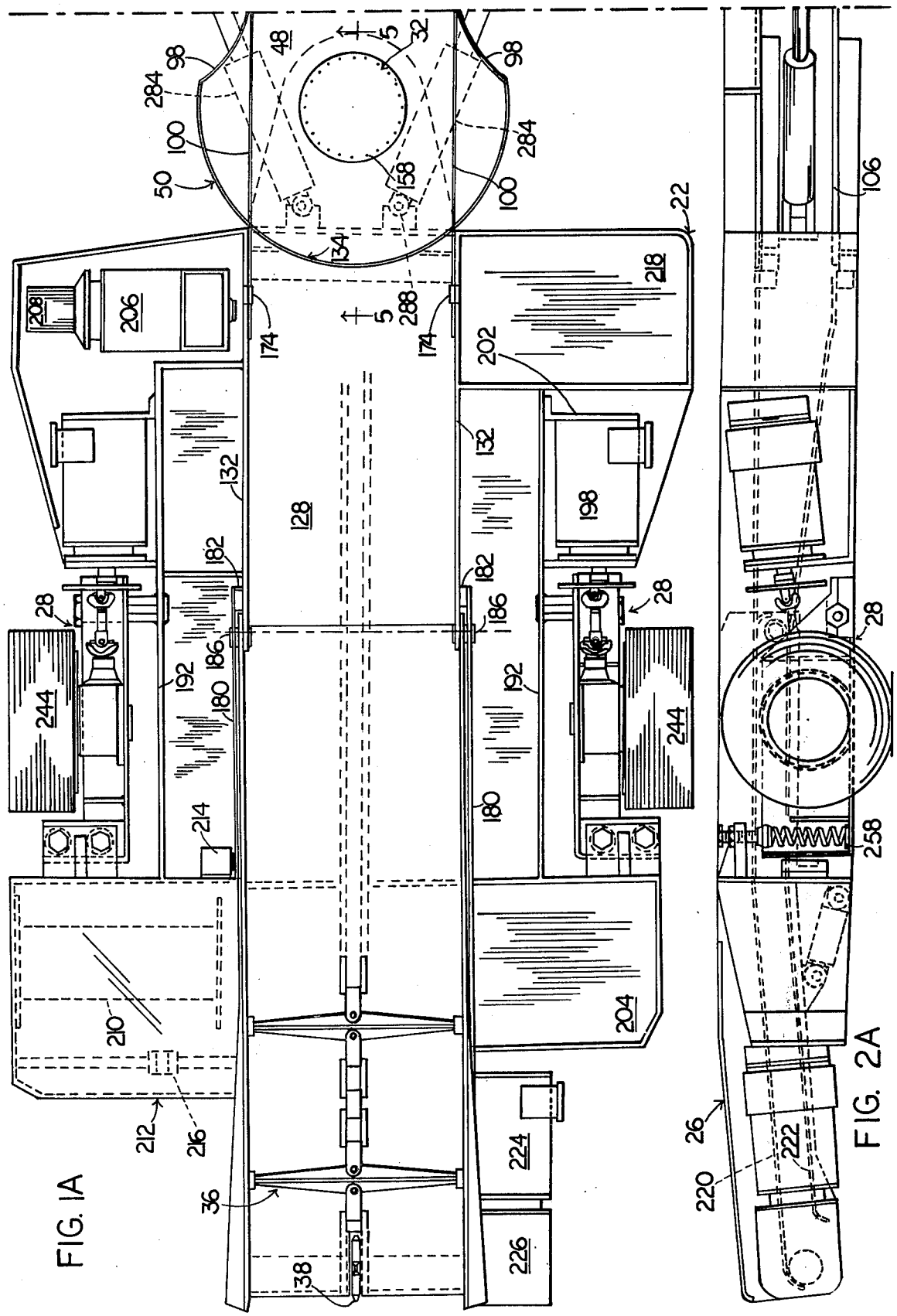

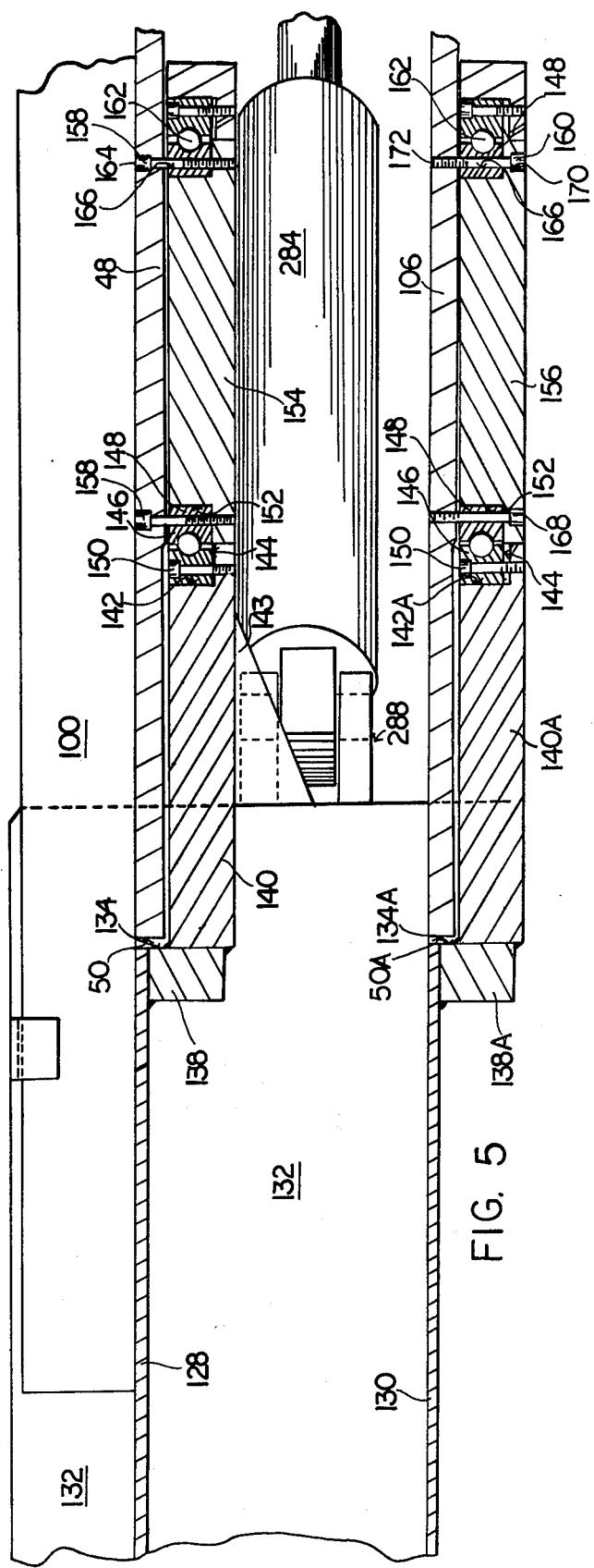
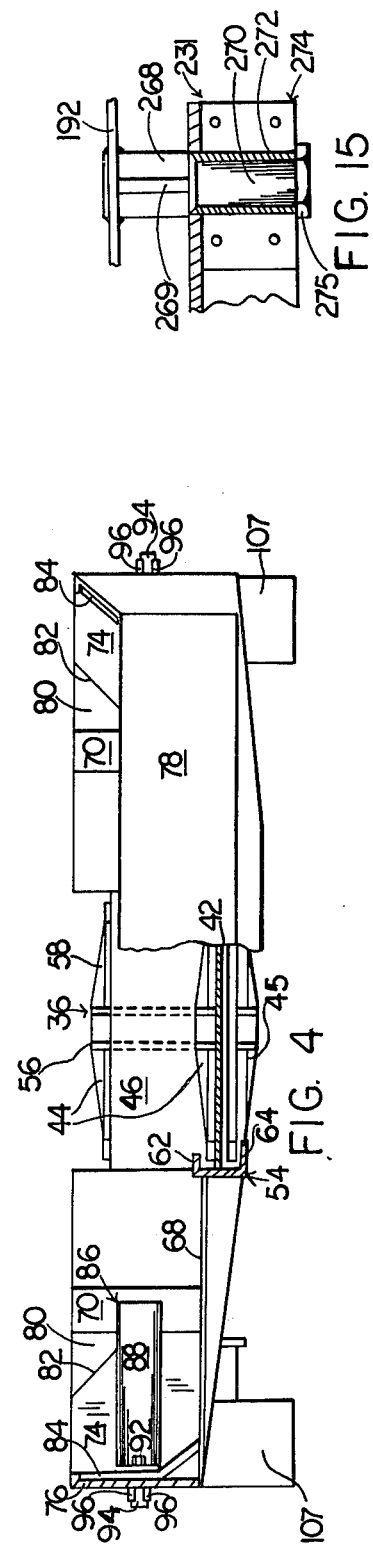
FIG. 5
FIG. 4
FIG. 15

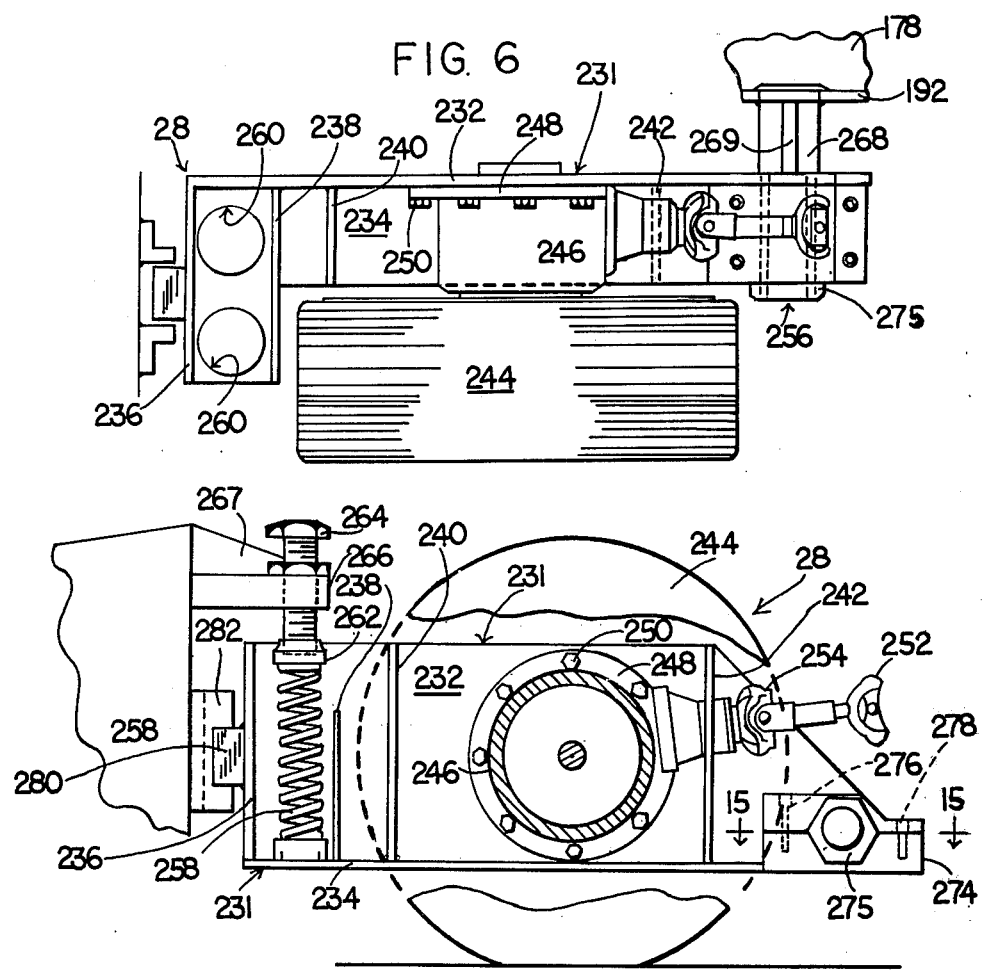
FIG. 6
FIG. 7
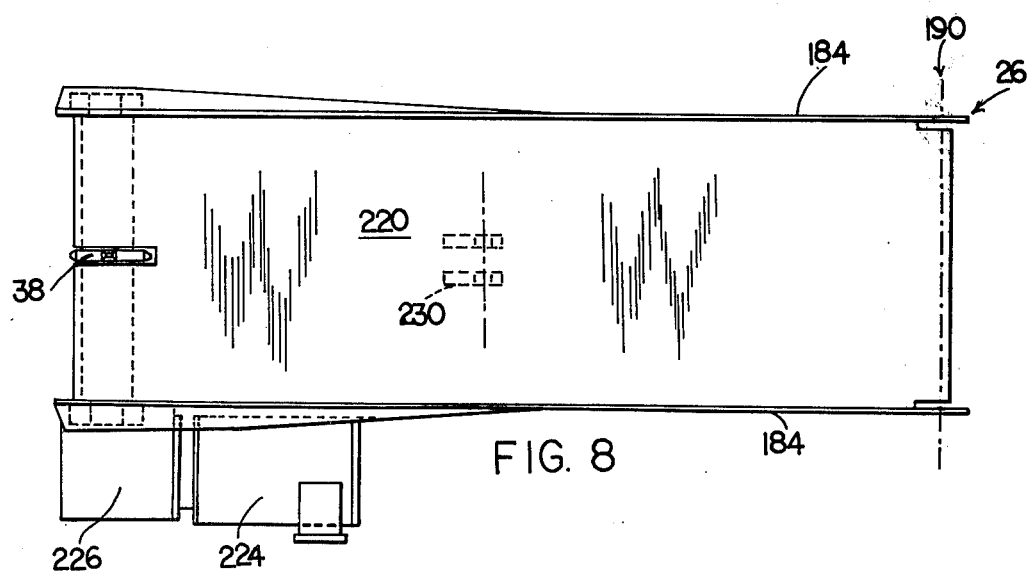
FIG. 8

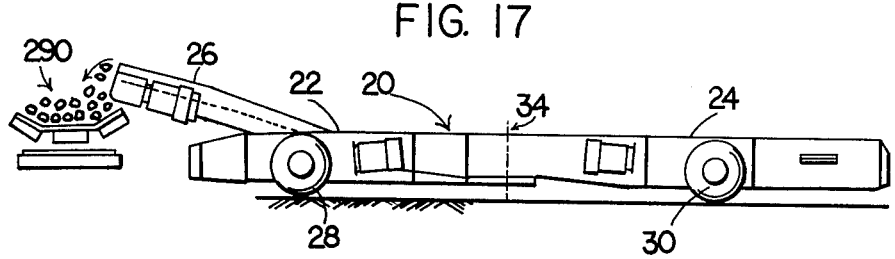
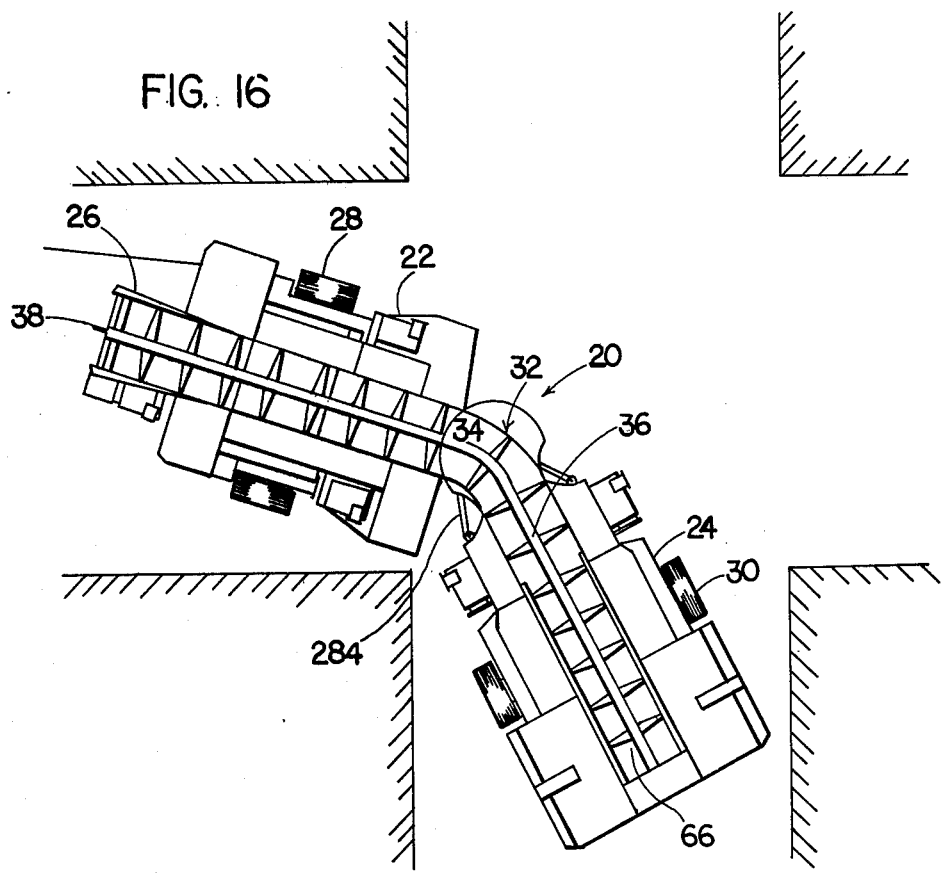
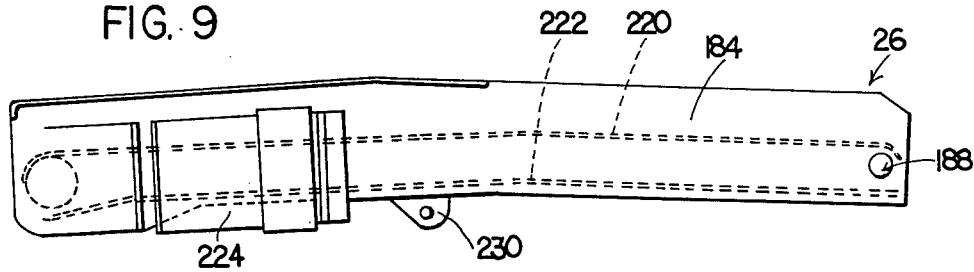

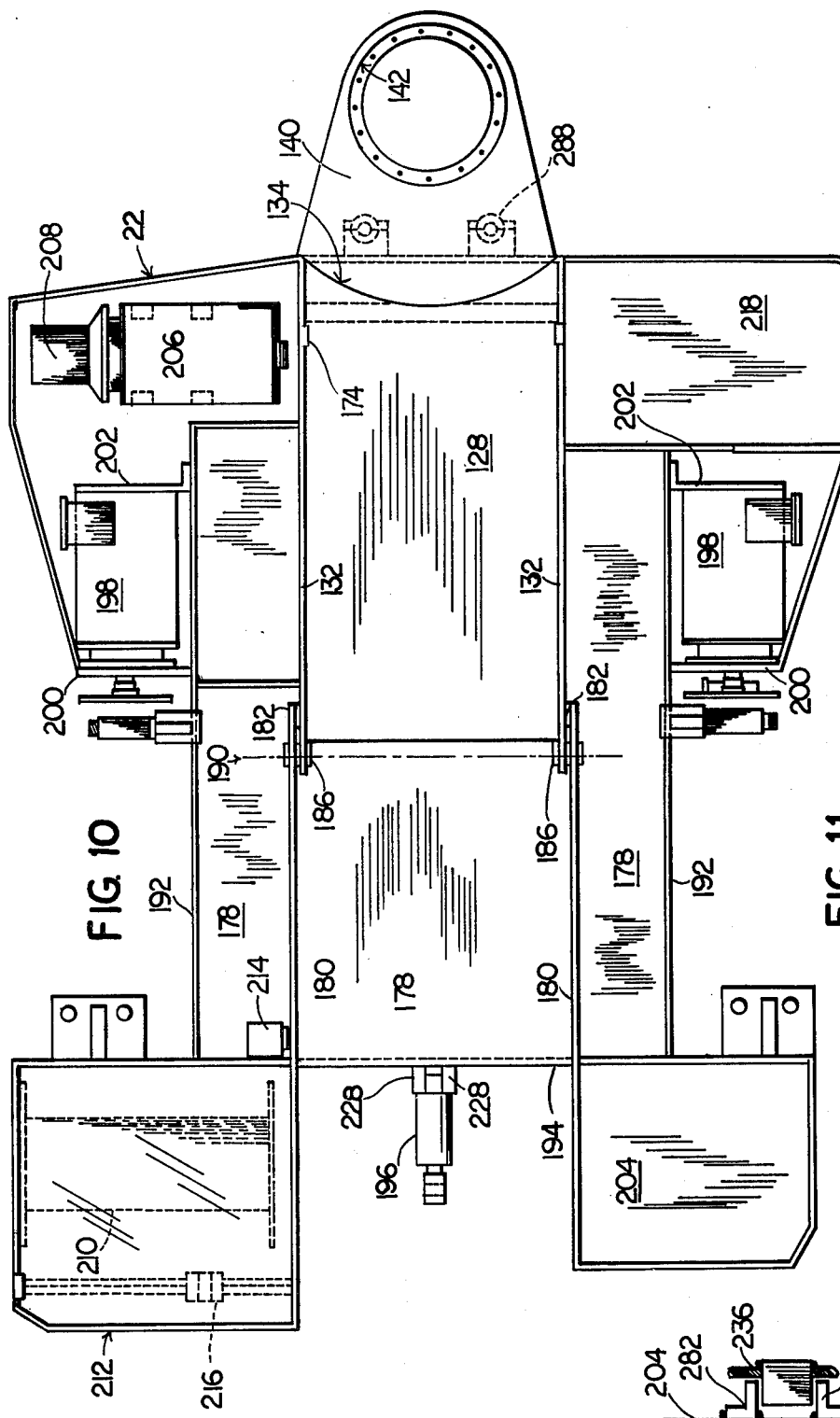
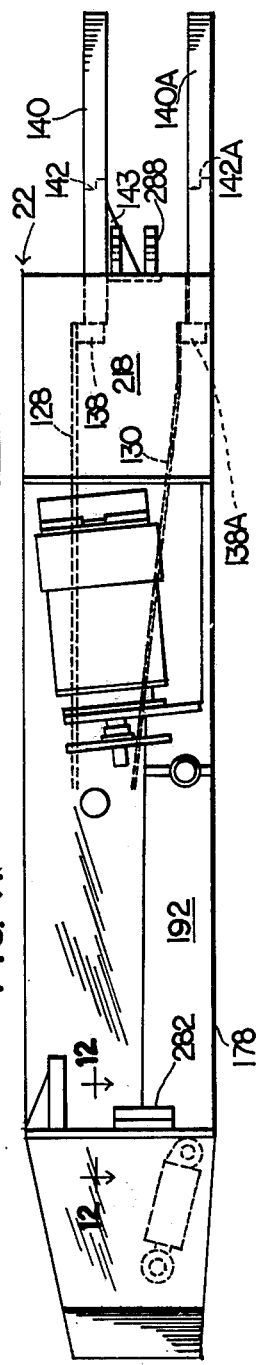
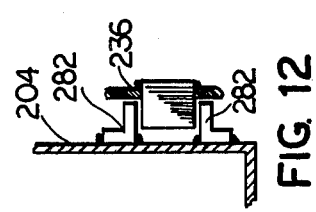

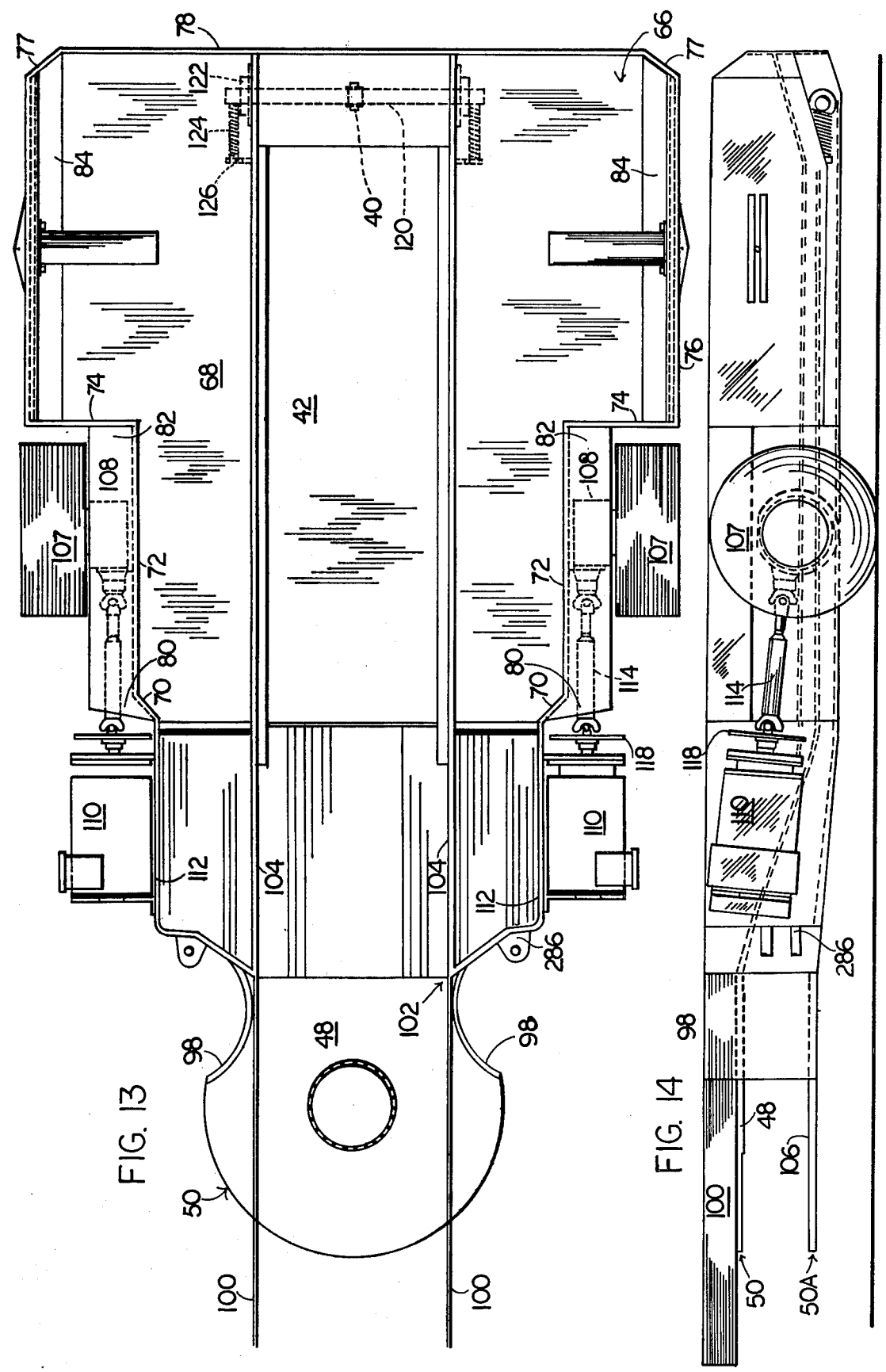

HORIZONTALLY ARTICULATED SHUTTLE CAR

BACKGROUND OF THE INVENTION

This invention belongs to the field of material haulage vehicles and more particularly to improvements in the type commonly known as "shuttle cars" for hauling loose mined material in underground mines.

Shuttle cars must operate in mine rooms and entries where the bottom and the top undulate, where height and space restrictions are severe, and where turning radiuses are tight. Yet they must provide large capacity along with rapid loading, carrying, and unloading of mined material in great tonnages. As shown for example in Russell U.S. Pat. No. 2,962,176, vertically articulated shuttle cars have been developed for low height, undulating passages. As the contour of the floor changes, fore and aft body sections pivot about a horizontal axis to prevent the underside or topside of the car from hanging up on the floor or roof.

However, in many mines it would be physically impossible for shuttle cars of adequate capacity to make the tight turns encountered without "brushing" the corners, i.e. blasting them off to eliminate the sharp turns. This, of course, is wasteful of labor and energy and could be avoided if shuttle cars could articulate horizontally to avoid the sharp corners, as shown in FIG. 16.

Attempts have been made to provide horizontal articulation in a mine haulage vehicle by using ejector scoops and shovel loaders. Examples are shown in U.S. Pat. No. 3,937,345 and the following equipment advertisements in the April 1976 Coal Age: pages 58 and 59, showing ejector buckets manufactured by Wagner Mining Equipment Co.; page 166, an ejector bucket manufactured by Fairchild Inc.; page 173, a scoop manufactured by Owens Mfg. Inc.; page 196, ram cars manufactured by Dresser Industries; page 205, a scoop/tractor manufactured by Pyott-Boone, Inc.; page 268, an ejector scoop manufactured by S & S Corporation; and pages 374, 375, an ejector scoop manufactured by Eimco Mining Machinery.

Although these units have a tractor section and a cargo section pivotally interconnected for horizontal swinging movement, they have a very serious drawback in that loading and unloading must both be done from the scoop or shovel end, requiring the machine to make two full 180° turns on each trip between the loading and unloading sites. This takes time and often requires brushing out a turn-around area which otherwise would be unnecessary.

There is a need for a horizontally articulated mine haulage vehicle which can receive a load at one end, convey it in one direction through the vehicle, and discharge it from the other end without turning the vehicle around.

SUMMARY OF THE INVENTION

It is therefore the major object of the present invention to provide an improved shuttle car with articulating pivot means enabling relative horizontal swinging movement between adjacent main body sections, and a horizontally flexible, orbitally movable conveyor means extending through the vehicle.

Another object of the present invention is to provide a mine haulage vehicle having an elongated body with a front outbye section and a rear inbye section which are interconnected at adjacent ends by vertical pivot means to enable the body sections to swing freely horizontally, relative to each other. The vehicle has a horizontally flexible centerstrand chain conveyor, orbitally movable about sprockets at opposite ends, the conveyor having an upper-load-carrying run, movable along the bottom of a cargo-carrying compartment in the inbye section and discharging from the front end of the outbye section, to provide one-direction loading and unloading while enabling the body to swing horizontally so it can negotiate sharp turns.

Another object is to provide a haulage vehicle as described in which the outbye section has an elevatable boom for the conveyor, enabling it to discharge into an elevated conveyor or mine car.

Another object is to provide a horizontally-articulated vehicle as described in which the pivot means includes vertically-spaced upper and lower horizontal rear portions of the front body section, pivotally connected respectively to vertically-spaced upper and lower horizontal front portions of the rear body section, the carrying reach of the conveyor being movable across the top of the pivotally-connected upper horizontal portions of the two sections, and the return reach of the conveyor being movable through the space between the pivotally-connected upper and lower horizontal portions of the two sections, thereby enabling the longitudinal axis of the conveyor to intersect the pivotal axis between the body sections while permitting horizontal articulation of the vehicle and straight-through transfer of material between the cargo-carrying compartment and the discharge end.

Another object is to provide a mine haulage vehicle as described in which a pair of vertical push blades are provided on opposite sides of the conveyor in the cargo compartment.

Another object is to support one of the body sections by wheels on opposite sides, each of the wheels being supported on a separate subframe independently of the other wheel, each subframe being pivotally mounted and tiltable against springs to provide a flexible suspension for the vehicle.

Other objects and advantages will be apparent from the following description taken in connection with the accompanying drawings in which:

BRIEF DESCRIPTION OF THE DRAWINGS

FIGS. 1 and 2 are plan and side views respectively of a mine haulage vehicle illustrating one form of the present invention, FIG. 1 being shown in two sections, FIGS. 1A and 1B, and FIG. 2 being shown in two sections, FIGS. 2A and 2B;

FIG. 3 is an enlarged fragmentary view of FIG. 1A;

FIG. 4 is a combined vertical sectional and rear view of FIG. 1B taken generally in the direction of the arrows 4—4;

FIG. 5 is an enlarged fragmentary cross-sectional view of FIG. 1A taken along line 5—5;

FIG. 6 is an enlarged top plan view of one of the wheel assemblies shown in FIG. 1A;

FIG. 7 is a partially cut-away side view of FIG. 6;

FIG. 8 is a top plan view of the discharge boom;

FIG. 9 is a side view of FIG. 8;

FIG. 10 is a top plan view of the front, outbye body section;

FIG. 11 is a side view of FIG. 10;

FIG. 12 is a fragmentary cross-sectional view of FIG. 11 taken along line 12—12, together with an associated portion of one of the wheel-supporting subframes;

FIG. 13 is a top plan view of the rear, inbye cargo-carrying body section;

FIG. 14 is a side view of FIG. 13;

FIG. 15 is a fragmentary view of FIG. 7 taken along line 15—15;

FIG. 16 is a top plan view of the mine haulage vehicle in an articulated condition, as it makes a turn around a sharp corner in a mine; and FIG. 17 is a side view of the vehicle with its discharge boom in a raised position for elevated load discharge onto a conveyor.

Like parts are referred to by like reference characters.

DESCRIPTION OF THE PREFERRED EMBODIMENT

Referring now to the specific embodiment of the invention in the drawings, and particularly to FIGS. 1, 2 and 16, the mine haulage vehicle is generally designated 20. It comprises an elongated body having a front or outbye section 22 and a rear or inbye section 24, the front section having an elevatable discharge boom 26. The vehicle is supported on pairs of individually self-powered front and rear wheel assemblies 28 and 30 respectively. The body sections are interconnected at adjacent ends by pivot means generally designated 32 enabling them to swing freely horizontally relative to each other about a vertical pivot axis 34; this enables steering the vehicle in a manner to clear corners as shown in FIG. 16. An orbitally movable, horizontally flexible, center strand chain flight conveyor 36 is trained between a front drive sprocket 38 and a rear idler sprocket 40.

The above basic components will now be described in more detail.

The frame of the rear body section 24 has a central, horizontal, longitudinally extending plate 42 for guiding the conveying run of the conveyor 36. An inclined plate section 46 guides the conveying run upward to a forwardly extending fan-shaped plate 48, the latter having a circularly extending leading edge 50 centered at axis 34.

Channel members 54 (FIG. 4) are affixed as by welding to opposite edges of the plate 42, providing guidance and support for both the conveying run 44 and return run 45 of the conveyor 36. The conveyor comprises a conventional center chain 56 with flights 58. Universal connecting links 60 enable the chain to flex vertically about the sprockets 38, 40, and horizontally when the two body sections are articulated about the axis 34.

The channel members 54 have upper inwardly extending flanges 62, functioning as hold-downs for the ends of the flights 58, and lower inwardly extending flanges 64 supporting the flights in the return run.

A load or cargo compartment 66 is provided in the inbye body section 24 and is defined by conveyor floor plates 42 and 68, side walls 70, 72, 74, 76, 77 and rear wall 78. In addition, the load or cargo-carrying compartment is defined by upwardly and outwardly flaring sideboard plates 80 and 82.

A pair of push blades 84, 84, are provided on opposite sides of the conveyor at the rear end of the cargo compartment 66. This facilitates a complete transfer of material to the conveyor during unloading, from the bottom plates 68 of the cargo compartment. Each push blade is movable toward and away from the conveyor between solid and broken line positions shown in FIG. 1B by hydraulic piston means 86. This comprises an outer cylinder 88 having a flange 90 fastened to the blade 84 by bolts 92. The usual arrangement (not shown) of multiple telescopic cylinders and pistons are provided internally of the outer cylinder 88 to provide the required range of movement for the push blade. That internal arrangement includes an inner piston shaft 94 extending through sidewall 76 and fastened between ribs 96, 96. Suitable conventional hydraulic inner ports and passages (not shown) are provided enabling the piston and cylinder means 86 to move the blades 84 reversibly between operative positions shown.

Curved, vertical, forwardly diverging side plates 98, 98 are fastened as by welding to the margins of the fan-shaped plate 48, extending up to the circular edge 50. Conventional spring sideplates 100, 100 are fastened as by welding or bolting at their rear ends 102 to the forward ends of the conveyor through sidewalls 104. As best shown in FIGS. 5 and 14, a lower level conveyor guide plate 106 extends forwardly from the rear body section 24 immediately below the plate 48.

Each wheel assembly 30 includes a rubber-tired wheel rotatively journaled in a gear box 108, which is fastened to the adjacent sidewall 72. An electric tram motor 110 is mounted on the adjacent sidewall 112 and is connected via drive shaft 114 and universal couplings 116 and 117 to drive the wheel 107 through the gear box. The rotor 118 for a disc brake is driven by the motor. It is located immediately adjacent the coupling 116. The brake comprises no part of the present invention so the caliper pads and other components are not shown. Each of the tram motors 110 may be energized by electric conductors and controls forming no part of the present invention and therefore are not shown.

At the rear end of body section 24, the rear idler sprocket 40 is mounted on a cross-shaft 120, the ends of which are journaled within bearing boxes 122 which are guided for fore and aft adjustment movement along channel members 54. A slot (not shown) is provided in each channel member to enable such fore and aft movement and the center chain 56 is tensioned by a pair of springs 124 acting between the journal boxes 122 and brackets 126. If desired, suitable conventional means (not shown) may be employed to vary the compression of the spring and therefore the tension in the conveyor chain.

The front, outbye body section 22 has a box-type central portion best shown in FIGS. 1A, 5, 10 and 11 consisting of upper and lower floor plates 128 and 130 and sidewalls 132, 132. The top surfaces of these floor plates are level respectively with the top surfaces of floor plates 48 and 106 to provide uninterrupted support for the upper and lower runs of the conveyor. The rear edges 134, 134a of these plates are curved to conform to the circularly extending leading edges 50, 50a of plates 48 and 106.

An important feature of the present invention is the extremely heavy-duty construction of the pivot means 32 which provides the horizontally swingable connection between the front and rear body sections and enables the conveyor upper and lower runs to operate through the pivot axis 34 at all angular positions, up to at least 45° in either direction. Heavy crossbars 138, 138a are welded beneath the plates 128, 130 and they have similarly heavy rear plate extensions 140, 140a welded thereon. Steel gussets 143 welded beneath the plate 140 furnish supplemental support. The plates are counterbored as at 142, 142a for vertically-spaced bearing elements now to be described.

Refer to FIG. 5. A ball- or roller-type turntable side and thrust bearing 144 has an outer race 146 and an inner race 148. Each outer race 146 is held in the counterbore 142 or 142a by means of cap bolts 150 which are threaded into the extensions 140, 140a. The inner races 148 are seated within counterbores 152, 152a in two circular retainer members 154 and 156. These are identical except for the apertures provided for the cap bolt fasteners 158 and 160, which, as shown in FIG. 5, are arranged respectively head up and head down.

To illustrate the size of the bearing components required, the bearing balls 162 are 1 inch in diameter and are arranged on a pitch diameter of 18.875". The outer diameter of the outer race and the inner diameter of the inner race are respectively 22.5" and 15.5" respectively. There are twenty-four cap bolts 158 with their heads seated within counterbores 164 in the top plate 48. They extend through bores 166 in the inner race, and at their opposite ends are screwed into threaded bores 168 in the member 154.

The heads of cap bolts 160 are seated within counterbores 170 in the underside of retainer disc 156. They extend upward through the bores 166 in the inner race 148 and are screw-connected into threaded openings 172 in plate 106.

As best shown in FIGS. 1A and 5, a small retainer tab 174 is fastened to the top edge of each sidewall 132 and is spaced inwardly to provide sliding clearance for the flexible spring sideplates 100. These slide between the walls 132 and tabs 174 when the body sections are swung relative to one another.

The lower floor plate 130 of the front body section 22 supports the conveyor return run 45. The forward portion of the body section 22 has a wide bottom frame plate 178 upon which various other compartments and components are supported. A pair of vertical frame plates 180 are spaced apart sufficiently that the discharge boom 26 will fit between them. The rear ends of the plates 180 and the forward ends of the sidewalls 132 are separated by means of spacers 182 (FIG. 10) providing room between them for the rearward ends of the sidewalls 184 of the discharge boom. Separate, aligned pivot stub shafts 186 are supported between the overlapping portions of the members 132 and 180. These fit within the pivot openings 188 (FIG. 9) in the discharge boom sidewalls enabling the latter to be tilted up and down about a tilt axis 190 (FIGS. 8 and 10).

To further strengthen the frame of front body section 22, a vertical reinforcing plate 192 is welded along each side edge of frame plate 178, and a vertical plate 194 is welded along the forward edge just beneath the conveyor and providing a mounting for elevating cylinder 196.

The front body section 22 has a number of other components which are individually conventional in the field of mining machinery and shuttle cars, so they will not be described in detail. Briefly however these include a pair of electric tram motors 198 fixedly mounted on the outsides of vertical plates 192 by brackets 200 and 202. An electric motor starter box 204 is provided for the four motors. An electric motor 206 is connected to drive a hydraulic pump 208 which supplies the various hydraulic oil pressure requirements for the vehicle. A cable reel drum 210 is mounted within a cable reel compartment 212 and is driven by a small hydraulic motor 214. A spooler 216 controls the laying of cable (not shown) on the drum, the cable supplying the electric power requirements of the various electrically driven components. An operator's compartment 218 contains the usual facilities, not shown, enabling an operator to sit inside, under a protective steel canopy, and tram the shuttle car in either direction, steer it, and operate the various movable components.

The elevatable boom 26 has upper and lower guide plates 220 and 222 for the upper and lower runs of the conveyor. A conveyor motor 224 drives the drive sprocket 38 through a gear reducer 226, both the motor and reducer being fixed on the side of the discharge boom as shown. The elevating cylinder 196 is pivotally connected at opposite ends to the brackets 228 on the front body section and brackets 230 on the underside of the boom to tilt the latter up and down about the axis 190 when the cylinder is actuated.

The flexible supports for the front wheel assemblies 28 will now be described. Refer first to FIGS. 6, 7, 12 and 15. Each wheel assembly 28 comprises a sub-frame 231 consisting of a main vertical plate 232, a horizontal base plate 234, a vertical front end plate 236, and vertical ribs 238, 240 and 242. A rubber-tired wheel 244 is rotatably supported on a gear reducer 246 which, in turn, is mounted by flange 248 and bolts 250 on the main plate 232. Each wheel is driven by one of the tram motors 198 through universal joints 252, 254 and the above-mentioned reducer 246.

Each sub-frame 231 has its rear end portion pivoted for up and down movement about an axis 256. The forward end portion is free to move against the compression of springs 258. The latter are retained at their bottoms within cup-like seats 260.

The upper ends of springs 258 are seated within downwardly facing cup-like seats similar to those designated 260, in an adjustment bar 262. A pair of adjusting bolts 264 are threadedly engaged through a mounting block 266 strengthened by gibs 267. The bottoms of these ajusting bolts bear against the top side of the adjustment bar 262. Rotation of the screws 264, therefore, adjust the level of the front end of the machine.

As shown in FIGS. 6, 7 and 15, the sub-frame 231 is journaled for up and down rocking movement on a post 268 affixed as by welding to the vertical plate 192 and stiffened by a steel gusset 269. A cylindrical shaft portion 270 is journaled within a sleeve bearing 272 which, in turn, is retained within a split bearing block 274, the two halves of which are held together by socket head cap screws 276 and 278. A nut 275 threaded to the end of each shaft 268 holds the corresponding sub-frame 231 assembled.

At the front, tiltable, end of the sub-frame 231, it is guided against excessive transverse movement by a slide block 280 attached to it as by welding. As shown in FIGS. 7 and 12, this fits between vertical guides 282 which are welded to the back wall of the starter box 204.

A pair of steering cylinders 284 are pivotally connected between mounts 286 and 288 on the rear and front body sections respectively.

To simplify the drawings and description, inlet and outlet ports and interconnecting tubing and control valves have purposely been omitted from the hydraulic components because the operation of these components will be obvious to any person skilled in the art. Briefly, however, the boom elevating cylinder 196 may be either a single-acting cylinder or a double-acting cylinder, preferably the latter. The reel hydraulic motor 214 will preferably be reversible. The steering cylinders 284 must be reversible to steer in both directions and will be interconnected so that pressure will be applied concurrently to the head end of one and the rod end of the other so that they both cooperate in the steering action in both directions.

In use, the mine haulage vehicle 20 will be positioned just outbye of a mining machine working at a face, with the cargo compartment 66 in position to receive coal or other mined material from the rear boom of the mining machine. In this position both the hydraulic piston and cylinder means 86 will be contracted to their maximum thereby drawing the push blades 84 outward against the sidewalls 76. As the compartment is loaded, the operator will periodically enerqize the conveyor motor 224 to move the conveyor and thereby fill the vehicle for its full length.

When the vehicle is thus completely filled from one end to the other and mounded up to the extent permitted by head room in the mine, the operator in compartment 218 trams it in an outbye direction to a transfer point, usually a fixed rubber belt or mine car.

A typical intersection in an underground mine is shown in FIG. 16 where the haulage vehicle is shown horizontally articulated (through the action of steering cylinders 284) enabling it to negotiate the sharp turns. It is obvious by inspection of FIG. 16 that it is only the result of the horizontal articulation of the two body sections about the pivot means 32 that this vehicle can operate in such tight quarters. When the vehicle reaches the main haulage conveyor 290 as shown in FIG. 17, cylinder 196 will be actuated to elevate the discharge boom over the conveyor, as shown.

The above described arrangement is illustrative of a small number of many possible specific embodiments of this invention. Other arrangements can readily be devised in accordance with the principles disclosed by those skilled in the art without departing from the spirit and scope of the invention.

The embodiments of the invention in which an exclusive property or privilege is claimed are defined as follows:

1. A mine haulage vehicle comprising:
   an elongated body having a front body section and a rear body section which are interconnected by a pivot section to enable said body sections to swing horizontally relative to each other about a vertical pivot axis;
   a pair of ground engaging wheels on each of said body sections;
   steering means including power means for swinging said body sections relative to one another about said vertical pivot axis;
   said front body section having a front floor plate and a pair of front sidewalls defining a front material-carrying conveyor trough;
   said rear body section having a rear floor plate and a pair of rear sidewalls defining a rear material-storing load compartment;
   said pivot section comprising -
   (a) an upper pair of overlapping plates connected respectively to said body sections, a top one of said plates being coplanar with said front floor plate;
   (b) a lower pair of overlapping plates connected respectively to said body sections and spaced below said upper pair of overlapping plates;
   (c) each of said pairs of overlapping plates being pivotally interconnected about said vertical pivot axis;
   (d) a pair of flexible sidewalls extending freely across said top one of said upper pair of overlapping plates connected between said pairs of front and rear sidewalls providing a flexible conveyor trough for guiding material across said pivot section throughout a range of horizontally swung positions of said front and rear body sections;
   a center strand conveyor trained for orbital movement about reversing means at the front and rear ends of said front and rear body sections respectively, said conveyor having an upper, conveying run movable along the rear floor plate, along the flexible conveyor trough, and along the front floor plate for loading material into the load compartment and for discharging material therefrom, said conveyor having a lower, return run movable from the front to the rear body sections across said lower pair of overlapping plates, said conveyor being horizontally flexible to follow a curved path through the flexible conveyor trough when the front and rear body sections are swung throughout their said range of horizontally swung positions.

2. A mine haulage vehicle according to claim 1 in which said rear floor plate is in the lower portion of the rear body section at a level below the level of said front floor plate, and said rear body section has an inclined floor plate training the upper run of the conveyor from the level of the rear floor plate to the level of the front floor plate.

3. A mine haulage vehicle according to claim 2 in which said center strand conveyor has a plurality of transverse flights the ends of which are overlain by a pair of spaced, parallel hold down flanges fastened to the rear floor plate along the sides of the conveyor.

4. A mine haulage vehicle according to claim 1 in which said steering means comprises piston and cylinder means connected respectively to said front and rear body sections and located in a vertical space between said upper and lower pairs of overlapping plates.

5. A mine haulage vehicle according to claim 1 in which said front body section includes a boom with a floor and sidewalls connected to said front body section by auxiliary pivot means to permit said boom to tilt freely vertically about an auxiliary pivot axis extending laterally of said body between the upper and lower runs of the conveyor;
   said floor of said boom, when horizontal, being substantially coplanar with said front floor plate and with said top plate of said upper pair of overlapping plates;
   said reversing means at the front end of the front body section being carried at the forward end of said boom; and
   power elevating means acting between said front body section and said boom actuatable to elevate the front end of said conveyor.

6. A mine haulage vehicle according to claim 1 in which said rear body section has transversely movable upstanding push blades on opposite sides of said conveyor, and power means for moving said push blades transversely of said body to transfer material from said material-storing load compartment to said conveyor to facilitate unloading said vehicle.

7. A mine haulage vehicle according to claim 6 in which said rear body section has horizontal floor portions flanking said conveyor, and said push blades are supported respectively on said rear sidewalls for movement across said horizontal floor portions, and said push blades are movable between outer, load-storing positions adjacent said sidewalls and inner, load-transferring positions adjacent said conveyor.

8. A mine haulage vehicle according to claim 1 in which the pair of ground engaging wheels on one of said body sections are supported independently of one another on opposite sides of said center strand conveyor;

said pair of wheels being rotatably journaled in separate sub-frames which are vertically tiltable independent of one another in vertical planes parallel to the direction of movement of the vehicle;

each sub-frame being pivoted at one end on said one body section about a horizontal pivot;

spring means between the opposite end of each sub-frame and said one body section to cushion vertical movement of the corresponding wheel;

motor means supported on said one body section adjacent said one end of each sub-frame; and means connecting each motor means to the wheel on the adjacent sub-frame including a drive shaft and universal coupling means therein adjacent said horizontal pivot.

9. A mine haulage vehicle according to claim 8 including guide means between said opposite end of each sub-frames and said one body section to guide said sub-frame for vertical tilting movement in said vertical planes.

* * * * *

UNITED STATES PATENT OFFICE
CERTIFICATE OF CORRECTION

Patent No. 4,160,619　　　　　　　　　　　Dated　July 10, 1979

Inventor(s)　Robert C. Nelson

It is certified that error appears in the above-identified patent and that said Letters Patent are hereby corrected as shown below:

In Column 10, line 14 change "sub-frames" to --sub-frame--

In Column 10, line 15 change "frame" to --frames--

Signed and Sealed this

Sixteenth Day of October 1979

[SEAL]

Attest:

RUTH C. MASON
Attesting Officer

LUTRELLE F. PARKER
Acting Commissioner of Patents and Trademarks